May 11, 1948.  J. E. MELTON  2,441,203
COTTON GIN
Filed March 19, 1945
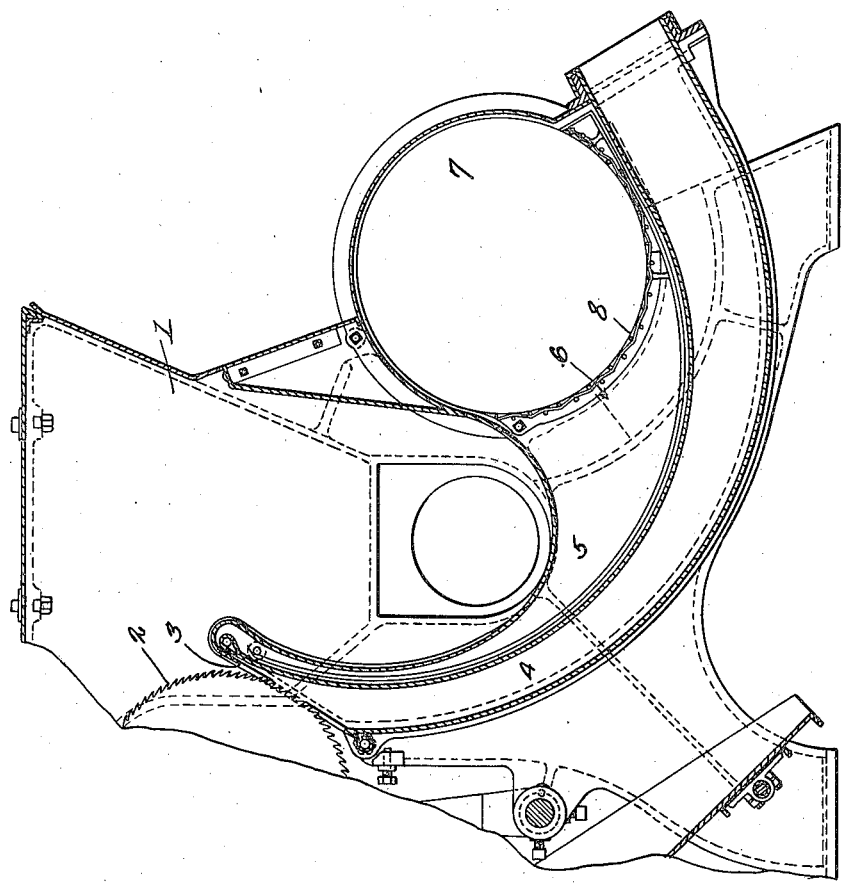
J.E.Melton
INVENTOR.
BY
ATTORNEYS.

Patented May 11, 1948

2,441,203

UNITED STATES PATENT OFFICE 2,441,203

COTTON GIN

James E. Melton, Arcola, Miss.

Application March 19, 1945, Serial No. 583,522

1 Claim. (Cl. 19—59)

This invention relates to cotton gins of the air blast type.

It is well-known to those skilled in the art that the air surrounding the gins is full of lint and this lint is picked up and carried with the air into the gins where it frequently clogs the nozzles from which the air is delivered against the gin saws.

It is an object of the present invention to improve upon gins of this type by providing a means whereby lint and other foreign substances floating in the air, will be separated from the air before it can reach the nozzles, with the result that the gins will operate more efficiently than heretofore has been possible.

A still further object is to provide a separator which can be combined with various types of air blast gins without greatly modifying their structures.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing, there has been shown a section through a portion of an air blast gin having the present improvement combined therewith.

Referring to the drawing by characters of reference, I designates a portion of a gin provided, adjacent to its saws 2 with a nozzle 3 whereby air under pressure will be directed against the saws for the purpose of stripping material therefrom and directing its into a lint flue 4.

An air duct 5 leads to the nozzle 3 and its large or inlet end 6 is in communication with the usual air flue or chamber 7.

Ordinarily, this air chamber 7 opens directly into the air duct and any lint or other particles held in suspension by the air, flows from the air chamber into the duct and hence to the nozzle 3. As before stated, this has frequently resulted in clogging of the nozzle with the further result of cutting off the flow of air to the saws and producing disastrous results.

The present invention includes the use of a filtering screen 8 which is interposed between the air chamber 7 and the duct 5. Thus no air can travel from said chamber into the duct without passing through the screen and this screen is of such a mesh as to separate from the air any fibrous particles in suspension. Consequently, the nozzle will be kept clear and the danger of clogging will be eliminated.

What is claimed is:

In combination with a gin of the air blast type including an air duct, a cylindrical air chamber at one end of the duct and opening at one end thereinto, and a nozzle at the other end of the duct, a filter screen interposed between the air chamber and the duct, corresponding in dimensions to the wall of the opening communicating between the air chamber and duct, and constituting a continuation of the wall of the air chamber, said screen being arcuate to conform with the curvature of the wall of the chamber.

JAMES E. MELTON.

REFERENCES CITED

The following references are of record in the file of this patent:

UNITED STATES PATENTS

| Number | Name | Date |
|---|---|---|
| 1,703,002 | Hart | Feb. 19, 1929 |
| 2,057,369 | Curley | Oct. 13, 1936 |
| 2,060,507 | Knowlton | Nov. 10, 1936 |
| 2,206,297 | Curley et al. | July 2, 1940 |
| 2,271,793 | Curley et al. | Feb. 3, 1942 |